(12) United States Patent
Findikli

(10) Patent No.: US 7,305,254 B2
(45) Date of Patent: Dec. 4, 2007

(54) SYSTEM AND METHOD OF SOFTWARE TRANSFER BETWEEN A MOBILE PHONE AND A MOBILE PHONE ACCESSORY

(75) Inventor: Nadi S. Findikli, Cary, NC (US)

(73) Assignee: Sony Ericsson Mobile Communications AB, Lund (SE)

(*) Notice: Subject to any disclaimer, the term of this patent is extended or adjusted under 35 U.S.C. 154(b) by 613 days.

(21) Appl. No.: 10/604,394

(22) Filed: Jul. 17, 2003

(65) Prior Publication Data

US 2005/0014531 A1   Jan. 20, 2005

(51) Int. Cl.
*H04B 1/38*   (2006.01)
*H04M 1/00*   (2006.01)

(52) U.S. Cl. ............ 455/557; 455/418; 455/419; 455/420; 455/550.1; 455/559; 713/168; 713/194; 709/201; 709/231

(58) Field of Classification Search ........ 455/418–420, 455/414.1, 550.1, 556.1, 556.2, 557, 559; 713/168, 194; 709/201–203, 231
See application file for complete search history.

(56) References Cited

U.S. PATENT DOCUMENTS

| | | | |
|---|---|---|---|
| 5,465,401 A | | 11/1995 | Thompson |
| 5,848,064 A | * | 12/1998 | Cowan ............ 370/338 |
| 6,189,146 B1 | * | 2/2001 | Misra et al. ........ 717/177 |
| 6,201,975 B1 | | 3/2001 | Isberg et al. |
| 6,493,871 B1 | * | 12/2002 | McGuire et al. ...... 717/173 |
| 6,496,979 B1 | * | 12/2002 | Chen et al. ........ 717/178 |
| 6,970,698 B2 | * | 11/2005 | Majmundar et al. ...... 455/419 |
| 6,976,167 B2 | * | 12/2005 | Nenashev ............ 713/168 |
| 7,165,173 B1 | * | 1/2007 | Herle ............... 713/151 |
| 2001/0046854 A1 | * | 11/2001 | Henry et al. ........ 455/419 |
| 2002/0034971 A1 | | 3/2002 | Samir et al. |

(Continued)

FOREIGN PATENT DOCUMENTS

EP    0 992 900 A2    4/2000

(Continued)

OTHER PUBLICATIONS

PCT International Search Report, PCT/IB2004/001074, Jul. 28, 2004.

(Continued)

*Primary Examiner*—Steve M. D'Agosta
(74) *Attorney, Agent, or Firm*—Moore & Van Allen, PLLC

(57) ABSTRACT

A system and method of operating a mobile phone accessory communicable with a mobile phone. The present invention dynamically loads software into a mobile phone from a mobile phone accessory to enable better management of the accessory's resources and capabilities. After a communication link is established between the mobile phone and mobile phone accessory, both devices exchange information to determine the appropriate software to transfer. A verification process then ensures that the mobile phone and mobile phone accessory are authorized to receive and transfer software, respectively. Subsequently, software is transferred from the mobile phone accessory to be stored in the mobile phone. The mobile phone is capable of executing the downloaded software. Specifically, the mobile phone contains the necessary API(s) and processor hardware needed to run a variety of software.

28 Claims, 2 Drawing Sheets

U.S. PATENT DOCUMENTS

2003/0229723 A1* 12/2003 Kangas et al. .............. 709/310
2004/0073901 A1* 4/2004 Imamatsu ................... 717/170
2004/0192274 A1* 9/2004 Vuori ......................... 455/418

FOREIGN PATENT DOCUMENTS

| WO | WO 99/53621 | | 10/1999 |
|---|---|---|---|
| WO | WO99-53621 | * | 10/1999 |
| WO | WO 01/43408 A1 | | 6/2001 |

OTHER PUBLICATIONS

PCT Written Opinion of the International Searching Authority.
International Application Ser. No. PCT/IB2004/001074, "International Preliminary Report on Patentability", (Jan. 23, 2006).

* cited by examiner

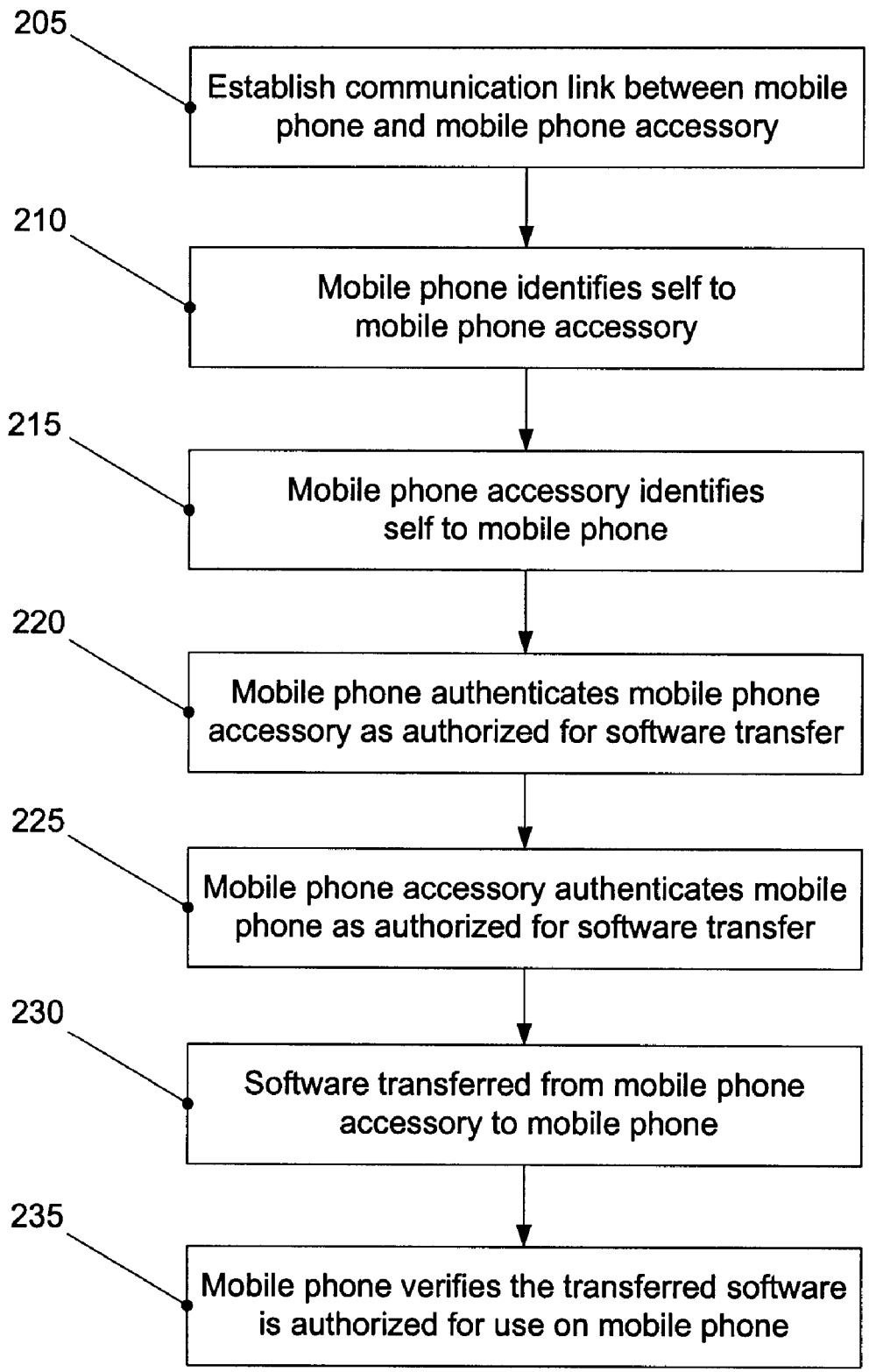

SYSTEM AND METHOD OF SOFTWARE TRANSFER BETWEEN A MOBILE PHONE AND A MOBILE PHONE ACCESSORY

BACKGROUND OF INVENTION

The present invention generally relates to mobile phone accessory management, and more specifically to management of the capabilities and resources of a mobile phone accessory through dynamic software loading.

When a mobile phone accessory is connected to a mobile phone, the user interface of the mobile phone typically needs to change to allow the user to exploit the additional capabilities offered by the mobile phone accessory. For example, a digital camera accessory will require additional user interface features for taking, viewing, and storing pictures. Ultimately, the mobile phone software may require modification to allow the user to manage the resources associated with the mobile phone accessory or to manage the mobile phone accessory itself. New or updated mobile phone software could add the functionality a mobile phone needs to take full advantage of the accessory. For example, mobile phone software may not initially enable pictures to be attached to emails; however, connecting a digital camera accessory to a mobile phone would necessitate the addition of such a feature.

Mobile phone accessories are often developed subsequent to the production of a mobile phone. Interaction between a mobile phone and a mobile phone accessory, as well as management of the mobile phone accessory itself, is typically restricted to pre-existing fixed menu structures and menu options already loaded into the mobile phone. Thus, support for the mobile phone accessory may be limited since the mobile phone was produced without knowledge of the subsequently developed mobile phone accessory.

With today's advanced mobile phone accessories, it is desirable to use a more flexible means of ensuring interaction between the mobile phone and a mobile phone accessory and to more fully realize the capabilities of the mobile phone accessory. Further, it is desirable to perform actions with the mobile phone accessory that are not conventionally associated with menu functions and to take advantage of the graphical user interface of a mobile phone. A higher level of security may also be exploited to effectively manage the extended capabilities.

SUMMARY OF INVENTION

The present invention provides a method of operating a mobile phone accessory communicable with a mobile phone. The method dynamically loads software into a mobile phone from a mobile phone accessory such that the software can be independently executed on the mobile phone platform. Dynamic software loading facilitates full resource realization by not limiting the operation and management of the mobile phone accessory to a pre-existing menu structure and mode of operation already residing in the mobile phone. As a result, the mobile phone is essentially converted into a differently operable and more capable device through the dynamic software loading process.

After a communication link is established between the mobile phone and mobile phone accessory, both devices exchange identification and configuration data to determine the appropriate software to transfer. Data pertaining to the software residing in the mobile phone accessory and the ability of the mobile phone to execute the software is shared. A verification process ensures that the mobile phone and mobile phone accessory are authorized to receive and transfer software, respectively. A software program or module is transferred or downloaded from the mobile phone accessory to be stored in the mobile phone. The mobile phone can then execute the downloaded program. Specifically, the mobile phone platform contains application program interfaces (APIs) and processor hardware capable of running a variety of different software programs or modules. The above mentioned APIs allow the software to perform functions using the existing hardware and software in the mobile phone, such as the display, speakers, keypad, etc.

BRIEF DESCRIPTION OF DRAWINGS

FIG. 2 is a flowchart illustrating a process for downloading software from a mobile phone accessory to a mobile phone.

DETAILED DESCRIPTION

Figure 1:
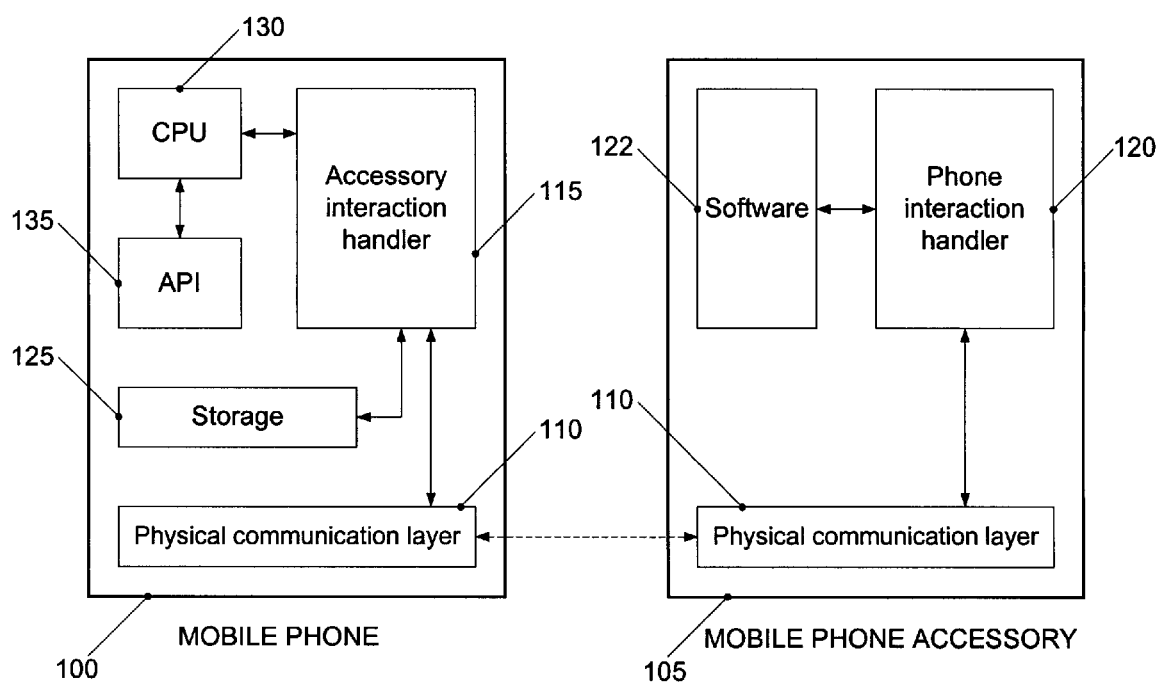
FIG. 1 is a block diagram illustrating functional components of the present invention.

FIG. 1 illustrates a mobile phone 100 and a mobile phone accessory 105 according to one embodiment of the present invention. For ease of illustration, not all of the components of mobile phone 100 or mobile phone accessory 105 have been shown. Mobile phone 100 and mobile phone accessory 105 both include a physical communication layer 110. The physical communication layers 110 are capable of establishing a communication link between mobile phone 100 and mobile phone accessory 105. The communication link can be a wireless radio frequency (RF), cabled, or optical link among others. The communication link facilitates communication between mobile phone 100 and mobile phone accessory 105 providing a means for effecting a software transfer.

Mobile phone 100 further includes an accessory interaction handler 115. The accessory interaction handler 115 communicates data pertaining to mobile phone 100 to mobile phone accessory 105. Specifically, accessory interaction handler 115 communicates data to mobile phone accessory 105 that is useful in determining the appropriate software to transfer from mobile phone accessory 105 to mobile phone 100. Such data can include, for instance, the hardware and software capabilities and characteristics of mobile phone 100.

The accessory interaction handler 115 is responsible for verifying that mobile phone accessory 105 is authorized to transfer software to mobile phone 100. After a transfer of software from mobile phone accessory 105 to the mobile phone 100, the accessory interaction handler 115 can verify that the software is licensed by the mobile phone manufacturer or its authorized agent for use on mobile phone 100. This step may be performed by embedding data within the software to identify its origin and credentials or by attaching a certificate to the software containing similar data. Further, the accessory interaction handler 115 can verify that the software has not been modified or corrupted since its initial creation. This step may be performed using data, either embedded in the software or attached as a certificate to the software, that verifies the consistency of the program. Such data may include, but is not limited to, a checksum or size check.

Mobile phone accessory 105 includes a corresponding phone interaction handler 120. The phone interaction handler 120 communicates data pertaining to mobile phone accessory 105 to mobile phone 100. Specifically, phone interaction handler 120 communicates data regarding the software that mobile phone accessory 105 is capable of transferring to mobile phone 100. Such information can include an accounting of the different types and versions of software available for transfer to mobile phone 100.

The phone interaction handler 120 is also capable of verifying that mobile phone 100 is authorized to receive software from mobile phone accessory 105. Specifically, phone interaction handler 120 can ensure that unlicensed software can not be transferred to mobile phone 100 or that otherwise protected software can not be transferred to an unauthorized mobile phone. If any of the previously mentioned verification or authorization steps fail, then a software transfer is aborted. An error message can be shown on the display of mobile phone 100 indicating why the software transfer was aborted.

Mobile phone accessory 105 further includes storage for software 122 related to the operation of mobile phone accessory 105. The software 122 can be in many forms and may include, but is not limited to, Java scripts, HTML pages, XML scripts, BREW scripts, C++ scripts, or native applications specific to a particular mobile phone 100. Multiple forms can accommodate varying cellular platforms such as Code Division Multiple Access (CDMA) or Global System for Mobile Communications (GSM). Further, mobile phone accessory 105 may store multiple copies of software 122 written in different programming languages and in different versions to ensure compatibility with a variety of mobile phones from a variety of manufacturers.

Based on the features and capabilities of the currently connected mobile phone 100, phone interaction handler 120 can select the software 122 best suited for a particular mobile phone 100. Features of mobile phone 100 which may affect the software selection process include, but are not limited to, the existence of a keyboard on mobile phone 100, the software currently loaded in mobile phone 100, or the display characteristics and type of mobile phone 100. Display characteristics include the size, resolution, whether or not the display is color or monochrome, and color depth.

Mobile phone 100 further includes sufficient storage 125 for receiving transferred software. Mobile phone 100 is also equipped with a processor 130 for executing software and a variety of APIs 135 to ensure usability with a variety of mobile phone accessories.

FIG. 2 illustrates the process of dynamic software loading from mobile phone accessory to mobile phone. First, the mobile phone and mobile phone accessory enter into a stage of device discovery. Device discovery begins with the establishment of any suitable communication link 205 between the two devices. This can be achieved using a wireless RF link such as Bluetooth™, and optical link such as infrared, or a cabled link. Device discovery encompasses both devices identifying themselves 210, 215 to one another. Device discovery may include manual steps initiated by the user or may be automatic.

Identification of the mobile phone to the mobile phone accessory 210 entails communicating to the mobile phone accessory that the mobile phone is capable of receiving stored software from the mobile phone accessory. Further, the mobile phone shares information regarding its hardware and software capabilities and characteristics useful for determining the appropriate software for transfer. For example, the mobile phone communicates information concerning its functional capabilities (such as display feature information and what software it is capable of executing), identity (such as software version information), and type (such as manufacturer and model information).

Likewise, identification of the mobile phone accessory to the mobile phone 215 entails communicating to the mobile phone that the mobile phone accessory is capable of transferring stored software to the mobile phone. Further, the mobile phone accessory shares information regarding its identity and type along with an accounting of the software it contains.

Device discovery is completed when the mobile phone and mobile phone accessory determine: (a) what software will be downloaded from the mobile phone accessory to the mobile phone; (b) which method of authentication, if any, will be used to verify that the mobile phone and mobile phone accessory are authorized to receive and transfer software, respectively; and (c) which method of encryption, if any, will be used to transfer the software.

After device discovery, the mobile phone ensures that the mobile phone accessory is authorized to transfer software to the mobile phone 220. Likewise, the mobile phone accessory must ensure that the mobile phone is authorized to receive software from the mobile phone accessory 225. This is termed device authentication. Authentication may be performed using one of a number of publicly available methods such as, for instance, Public Key Infrastructure (PKI), using a proprietary method developed as part of the dynamic software loading feature, or using a proprietary method developed by a mobile phone (or mobile phone accessory) manufacturer and made available to a mobile phone accessory (or mobile phone) manufacturer.

After mutual device authentication 220, 225 occurs, transfer of the software 230 from the mobile phone accessory to the mobile phone can take place. The software may be encrypted prior to transfer to provide further security. Encryption may be performed using one of a number of publicly available methods such as, for instance, Data Encryption Standard (DES), using a proprietary method developed as part of the dynamic software loading feature, or using a proprietary method developed by a mobile phone (or mobile phone accessory) manufacturer and made available to a mobile phone accessory (or mobile phone) manufacturer.

After receiving and storing the software from the mobile phone accessory, the mobile phone then verifies the authenticity of the software 235. Specifically, the mobile phone verifies that the mobile phone manufacturer has licensed the software to be used on the mobile phone. This step can be performed by examining data embedded within the software itself or contained within a certificate attached to the software. Such data can identify the origin and credentials of the software. The mobile phone can then compare this data against acceptable values or certificates stored within the mobile phone itself or can perform additional steps to complete PKI verification. The mobile phone can also implement a security check to ensure the software has not been modified or tampered with since its original creation. This step may be performed using data, either embedded in the software or attached as a certificate to the software, that verifies the consistency of the program. Such data may include, but is not limited to, a checksum or size check. The mobile phone can re-create the verification data based on the software it has received. The re-created verification data can then be compared to the transferred verification data delivered via secure means to determine the authenticity and integrity of the transferred software.

Specific embodiments of an invention are disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of means for is intended to evoke a means-plus-function reading of an element and a claim, whereas, any elements that do not specifically use the recitation means for, are not intended to be read as means-plus-function elements, even if the claim otherwise includes the word means.

The invention claimed is:

1. A method of operating a mobile phone accessory possessing one or more software programs and communicable with a mobile phone, the method comprising:
   (a) establishing a short range communication link between the mobile phone and the mobile phone accessory;
   (b) exchanging data between the mobile phone and the mobile phone accessory via the short range communication link, the data pertaining to the one or more software programs resident on the mobile phone accessory including:
      the technical requirements of the mobile phone necessary to host and execute the one or more software programs on the mobile phone;
      whether the one or more software programs are licensed for use with the mobile phone; and
      whether the mobile phone is authorized to host and execute the one or more software programs to be received from the mobile phone accessory,
      wherein the data is used to determine which software programs to transfer from the mobile phone accessory to the mobile phone;
   (c) transferring only the one or more software programs from the mobile phone accessory to the mobile phone via the short range communication link that meet the technical, licensing, and authorization requirements necessary to host and execute the one or more software programs on the mobile phone; and
   (d) verifying that the transferred software programs have not been tampered with since their creation.

2. The method of claim 1 further comprising encrypting the software programs before the transferring step.

3. The method of claim 1 wherein the communication link is a wireless RF link.

4. The method of claim 1 wherein the communication link is a cabled link.

5. The method of claim 1 wherein the communication link is an optical link.

6. The method of claim 1 wherein the one or more software programs is a Java script.

7. The method of claim 1 wherein the one or more software programs is an HTML script.

8. The method of claim 1 wherein the one or more software programs is a XML script.

9. The method of claim 1 wherein the one or more software programs is a native application specific to the mobile phone.

10. The method of claim 1 wherein the one or more software programs is a C++ script.

11. The method of claim 1 wherein the one or more software programs is a BREW script.

12. A system for operating a mobile phone accessory possessing one or more software programs and communicable with a mobile phone, the system comprising:
   a physical communication layer in the mobile phone and the mobile phone accessory for providing a short range communication link between the mobile phone and the mobile phone accessory;
   an accessory interaction handler within the mobile phone for:
      exchanging data with the mobile phone accessory, the data pertaining to the one or more software programs resident on the mobile phone accessory including:
         the technical requirements of the mobile phone necessary to host and execute the one or more software programs on the mobile phone;
         whether the one or more software programs are licensed for use with the mobile phone; and
         whether the mobile phone is authorized to host and execute the one or more software programs to be received from the mobile phone accessory,
         wherein the data is used to determine which software programs to transfer from the mobile phone accessory to the mobile phone; and
      receiving only the one or more software programs from the mobile phone accessory via the physical communication layer that meet the technical, licensing, and authorization requirements necessary to host and execute the one or more software programs on the mobile phone;
      verifying that the transferred software programs have not been tampered with since their creation; and
   a phone interaction handler within the mobile phone accessory for:
      exchanging data with the mobile phone; and
      transferring only the one or more software programs to the mobile phone via the physical communication layer that meet the technical, licensing, and authorization requirements necessary to host and execute the one or more software programs on the mobile phone.

13. The system of claim 12 wherein the mobile phone further comprises memory for storing the software programs.

14. The system of claim 12 wherein the mobile phone further comprises at least one application program interface (API) coupled with a processor for executing the transferred software programs.

15. A mobile phone operable with a mobile phone accessory possessing one or more software programs, the mobile phone comprising:
   a physical communication layer for providing a communication link between the mobile phone and the mobile phone accessory;
   an accessory interaction handler for:
      exchanging data with the mobile phone accessory, the data pertaining to the one or more software programs resident on the mobile phone accessory including:
         the technical requirements of the mobile phone necessary to host and execute the one or more software programs on the mobile phone;
         whether the one or more software programs are licensed for use with the mobile phone; and
         whether the mobile phone is authorized to host and execute the one or more software programs to be received from the mobile phone accessory,
         wherein the data is used to determine which software programs to transfer from the mobile phone accessory to the mobile phone;
      receiving only the one or more software programs from the mobile phone accessory via the physical communication layer that meet the technical, licensing, and authorization requirements necessary to host and execute the one or more software programs on the mobile phone; and verifiying that the transferred software programs have not been tampered with since their creation.

16. The mobile phone of claim 15 wherein the mobile phone further comprises memory for storing the transferred software programs.

17. The system of claim 15 wherein the mobile phone further comprises at least one application program interface (API) coupled with a processor for executing the software programs.

18. A system for operating a mobile phone accessory communicable with a mobile phone, the system comprising:
   means for establishing a short range communication link between the mobile phone and the mobile phone accessory;
   means for exchanging data between the mobile phone and the mobile phone accessory via the short range communication link, the data pertaining to the one or more software programs resident on the mobile phone accessory including:
      the technical requirements of the mobile phone necessary to host and execute the one or more software programs on the mobile phone;
      whether the one or more software programs are licensed for use with the mobile phone; and
      whether the mobile phone is authorized to host and execute the one or more software programs to be received from the mobile phone accessory,
   wherein the data is used to determine which software programs to transfer from the mobile phone accessory to the mobile phone;
   means for transferring only the one or more software programs from the mobile phone accessory to the mobile phone via the short range communication link that meet the technical, licensing, and authorization requirements necessary to host and execute the one or more software programs on the mobile phone; and
   means for verifying that the transferred software programs have not been tampered with since their creation.

19. The system of claim 18 further comprising means for encrypting the software programs before transferring.

20. The system of claim 18 wherein the communication link is a wireless RF link.

21. The system of claim 18 wherein the communication link is a cabled link.

22. The system of claim 18 wherein the communication link is an optical link.

23. The system of claim 18 wherein the one or more software programs is a Java script.

24. The system of claim 18 wherein the one or more software programs is an HTML script.

25. The system of claim 18 wherein the one or more software programs is a XML script.

26. The system of claim 18 wherein the one or more software programs is a native application specific to the mobile phone.

27. The system of claim 18 wherein the one or more software programs is a C++ script.

28. The system of claim 18 wherein the one or more software programs is a BREW script.

* * * * *